United States Patent
Lin et al.

(10) Patent No.: US 7,510,250 B2
(45) Date of Patent: Mar. 31, 2009

(54) COVER MECHANISM

(75) Inventors: Yang-Ming Lin, Shenzhen (CN); Xiao-Zhong Jing, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 179 days.

(21) Appl. No.: 11/369,701

(22) Filed: Mar. 7, 2006

(65) Prior Publication Data

US 2007/0013277 A1 Jan. 18, 2007

(30) Foreign Application Priority Data

Jul. 15, 2005 (CN) .................... 2005 2 0061654 U

(51) Int. Cl.
*A47B 81/00* (2006.01)
(52) U.S. Cl. .................... 312/223.2; 312/327
(58) Field of Classification Search .............. 312/223.2, 312/223.1, 327, 328; 292/175, 163, DIG. 38, 292/DIG. 61, DIG. 63, 337, 164, 171, 173
See application file for complete search history.

(56) References Cited

U.S. PATENT DOCUMENTS

| | | | | | |
|---|---|---|---|---|---|
| 2,301,856 | A | * | 11/1942 | Conwell | 49/203 |
| 4,478,005 | A | * | 10/1984 | Mundschenk | 49/388 |
| 4,656,337 | A | * | 4/1987 | Lastofka et al. | 219/386 |
| 4,850,657 | A | * | 7/1989 | Placke et al. | 361/685 |
| 5,062,671 | A | * | 11/1991 | Goetz et al. | 292/175 |
| 5,724,226 | A | * | 3/1998 | Ruch et al. | 361/683 |
| 6,125,031 | A | * | 9/2000 | Della Fiora et al. | 361/683 |
| 6,134,116 | A | * | 10/2000 | Hoss et al. | 361/747 |
| 6,189,938 | B1 | * | 2/2001 | Nakadaira et al. | 292/87 |
| 6,227,632 | B1 | * | 5/2001 | Liu | 312/223.2 |
| 6,466,435 | B2 | * | 10/2002 | Dong | 361/685 |
| 6,485,119 | B1 | * | 11/2002 | Davis et al. | 312/244 |
| 6,595,605 | B1 | * | 7/2003 | Babcock et al. | 312/223.2 |
| 7,139,167 | B2 | * | 11/2006 | Yang | 361/686 |
| 2003/0132687 | A1 | * | 7/2003 | Morris et al. | 312/333 |
| 2005/0067923 | A1 | * | 3/2005 | Mariano | 312/223.2 |
| 2005/0286216 | A1 | * | 12/2005 | Chen et al. | 361/683 |
| 2006/0221561 | A1 | * | 10/2006 | Guo et al. | 361/679 |
| 2006/0245159 | A1 | * | 11/2006 | Lin et al. | 361/685 |
| 2007/0153470 | A1 | * | 7/2007 | Chen et al. | 361/685 |

FOREIGN PATENT DOCUMENTS

| | | |
|---|---|---|
| CN | 2558001 | 6/2003 |
| TW | 577567 | 2/2004 |

* cited by examiner

*Primary Examiner*—Janet M Wilkens

(57) ABSTRACT

A cover mechanism includes a bezel (10), a latch (30), and a cover 20 movably attached to the bezel. The cover includes a pair of tabs (22) formed thereon, each with a shaft (222) extending therefrom. The bezel includes a plurality of tabs (142) extending therefrom each with a pivoting hole (144) to engage with the shaft of the cover. The latch is slidably attached to the cover to engage with the bezel.

18 Claims, 7 Drawing Sheets

COVER MECHANISM

BACKGROUND OF THE INVENTION

1. Field of the Invention

The present invention relates to cover mechanisms on a front panel of a computer chassis, more particularly a pivotal cover mechanism on a front panel of a computer chassis that allows users to install or remove computer peripherals quickly without removing the front panel and the cover mechanism.

2. General Background

With the continuous innovative development of technologies, the speed of upgrading computer peripherals and equipments tends to be faster. For example, a user needs to replace a low-speed VCD drive with a high-speed VCD drive or a DVD drive, or add another hard disk with more memory capacity, etc. For these upgrades, it is necessary to open the computer chassis for the installation. If a user needs to change or install a hardware device that does not involve any panel operation, the user just needs to open the chassis and mounts the equipment onto the rack inside the chassis, and finally connects the power and bus cable to complete the installation.

If a user needs to install or change a hardware device such as a VCD drive or a detachable hard disk drive that involves panel operation, it is necessary to remove the front panel. Since the front panel includes a plurality of bay slots, a cover for covering the surface of the bay slot and preventing foreign substance or dust. Therefore, if it is necessary to expose the operating panel of such device on the front panel, the cover corresponding to such device must be removed. Therefore, in addition to the foregoing installation procedure for device that does not involve panel operation, it also requires the procedure of removing and reinstalling the front panel and the cove. Such repeated removing and reinstalling procedure is a waste of time. Furthermore, the cover may be lost easily if it is removed and not used for a long time, and the evenness and artistic look of the front panel may also be affected.

What is needed, therefore, is a cover mechanism which allows users to install or remove computer peripherals without removing the front panel and the cover.

SUMMARY

In a preferred embodiment, a cover mechanism includes a bezel, a latch, and a cover movably attached to the bezel. The cover includes a pair of tabs formed thereon, each with a shaft extending therefrom. The bezel includes a plurality of tabs extending therefrom each with a pivoting hole to engage with the shaft of the cover. The latch is slidably attached to the cover to engage with the bezel.

Other objects, advantages and novel features of the present invention will become more apparent from the following detailed description of preferred embodiment when taken in conjunction with the accompanying drawings, in which:

DETAILED DESCRIPTION OF THE PREFERRED EMBODIMENT

Figure 1:
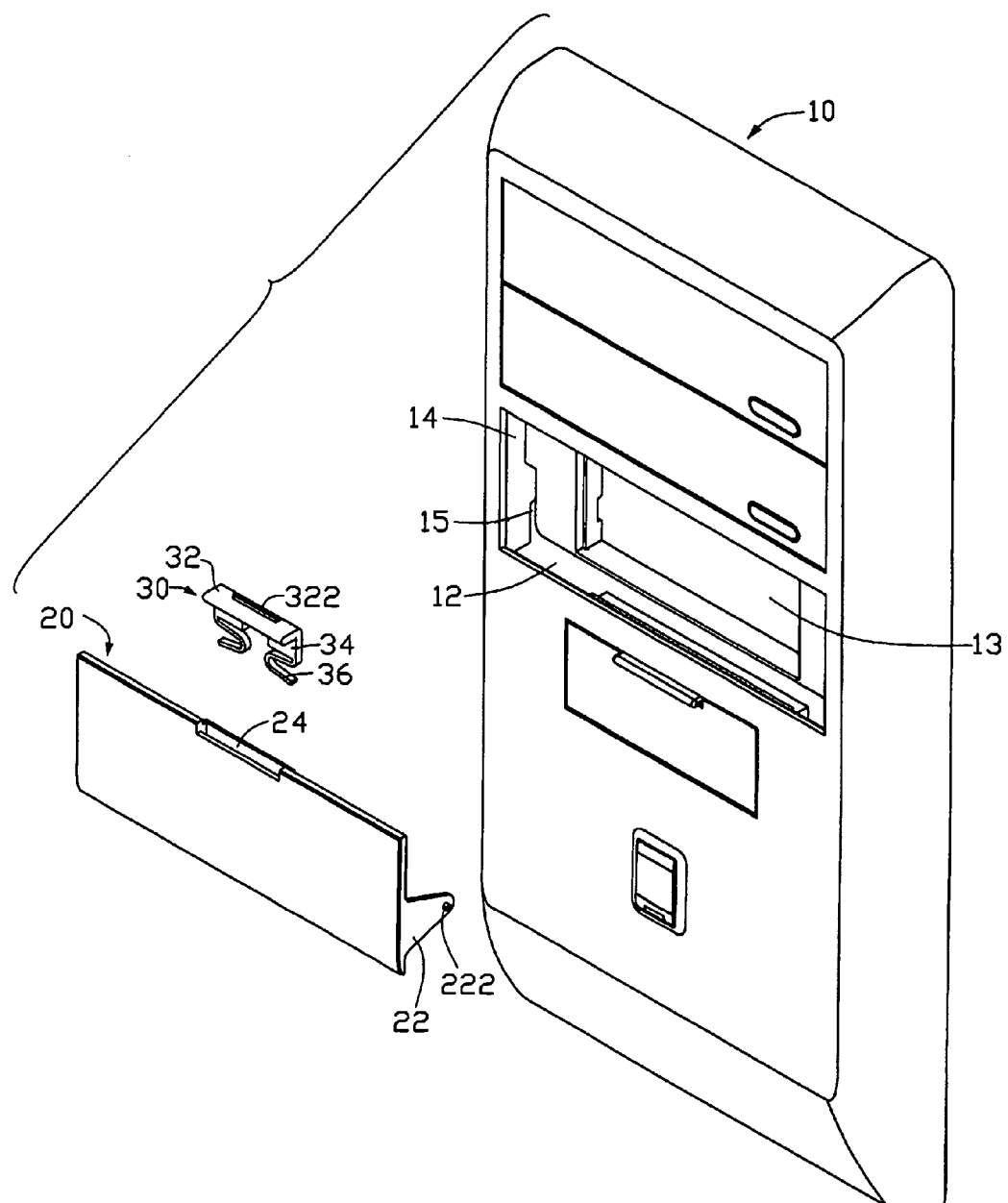
FIGS. 1 and 2 are exploded, isometric views of a cover mechanism in accordance with a preferred embodiment of the present invention together with a bezel, but viewed in different views.
Figure 2:
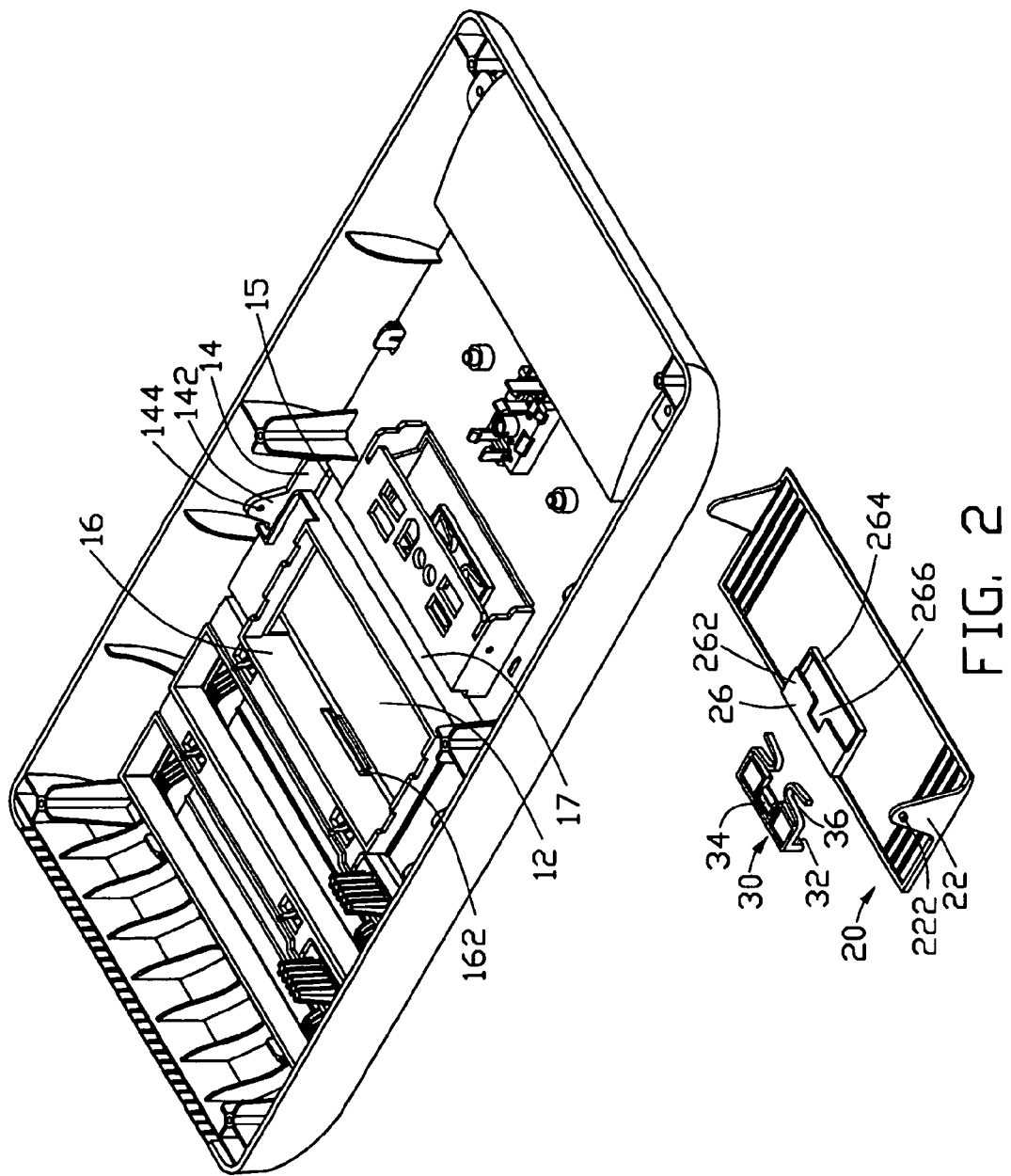
Figure 3:
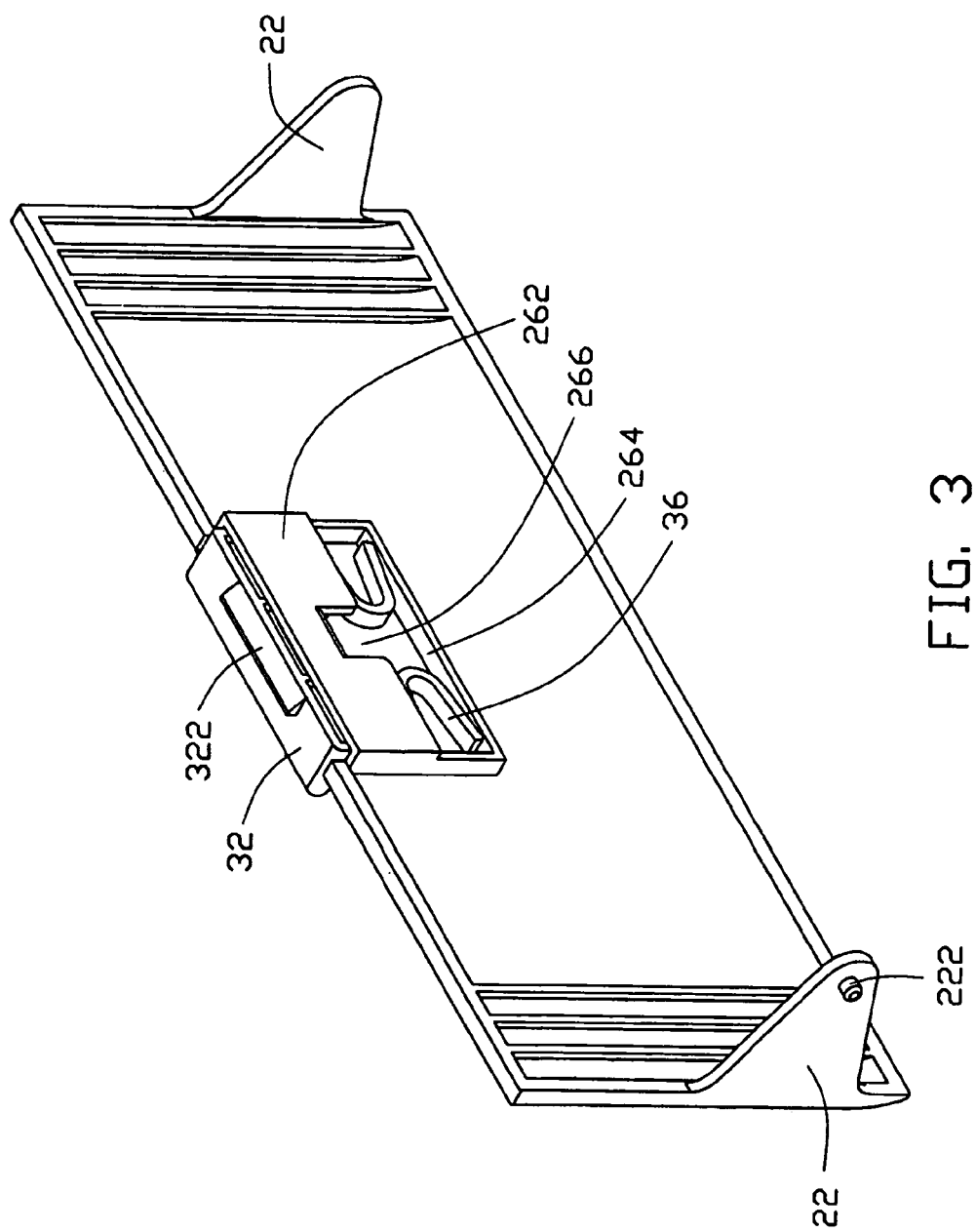
FIG. 3 is an assembled view of a cover and a latch member of FIG. 2.
Figure 4:
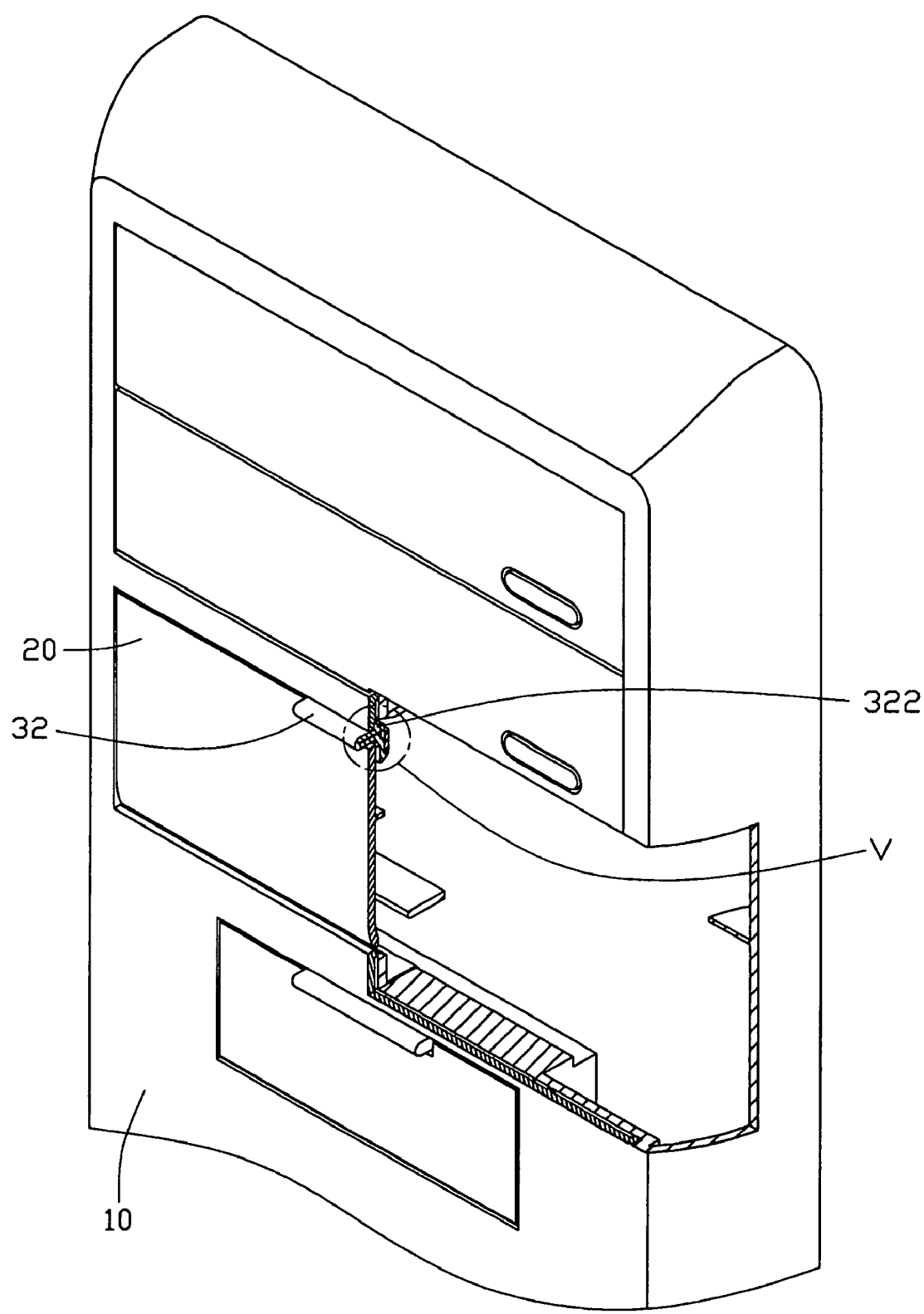
FIG. 4 is an assembled view of FIG. 1, but partially been cut off.

Referring to FIGS. 1 and 2, a cover mechanism of an electronic device like a computer in accordance with a preferred embodiment of the present invention includes a cover 20 attached to a bezel 10 of the electronic device, and a latch member 30.

Figure 5:
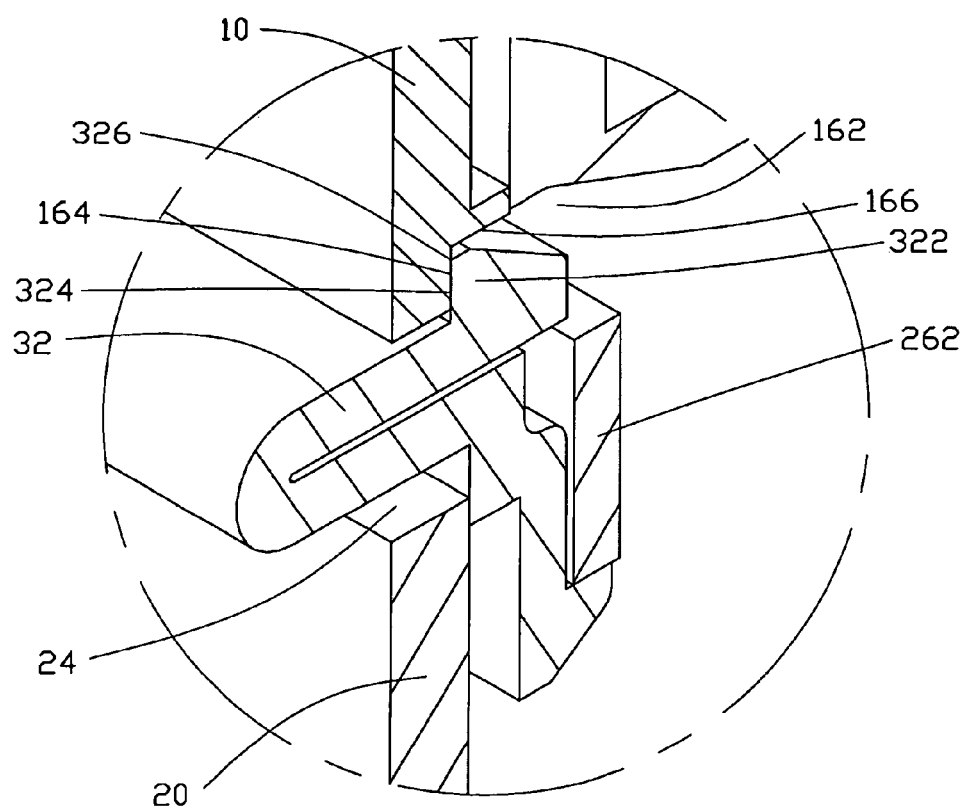
FIG. 5 is an enlarged view of a circled portion V of FIG. 4.

The bezel 10 is often rectangular, and mounted on a front surface of a computer chassis (not shown). The bezel 10 includes a recess 12 defined therein. The recess 12 further comprises an opening 13, and a pair of channels 15 defined besides the opening 13. The opening 13 is for mounting internal devices of the computer, for example, read/write devices such as storage drivers (not shown) and I/O interface components (not shown). A pair of first tabs 142 extends rearwardly from an inner side 14 of the bezel 10, beside the channels 15. Each of the first tabs 142 defines a pivoting hole 144 therein. The opening 13 includes an engaging portion 16 formed at a top portion of the opening 13. Referring also to FIGS. 2 and 5, the engaging portion 16 defines a latch slot 162 therein. A vertical wall 164 and a horizontal wall 16 are separately formed around the latch slot 162. A passage 17 is defined in a bottom portion of the recess 12.

Figure 6:
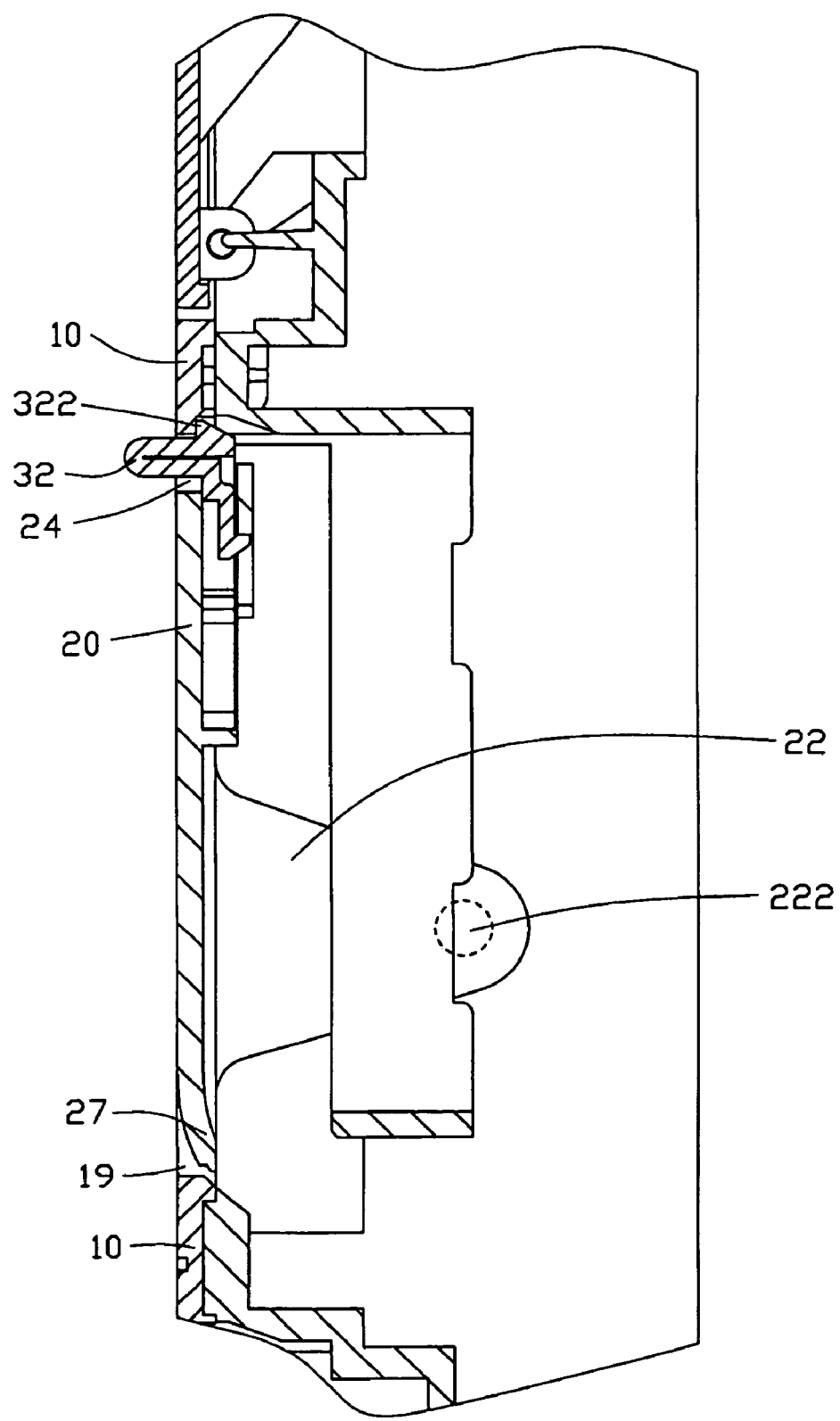
FIG. 6 and FIG. 7 are schematic views of the cover mechanism of the preferred embodiment of the present invention respectively in two different states.
Figure 7:
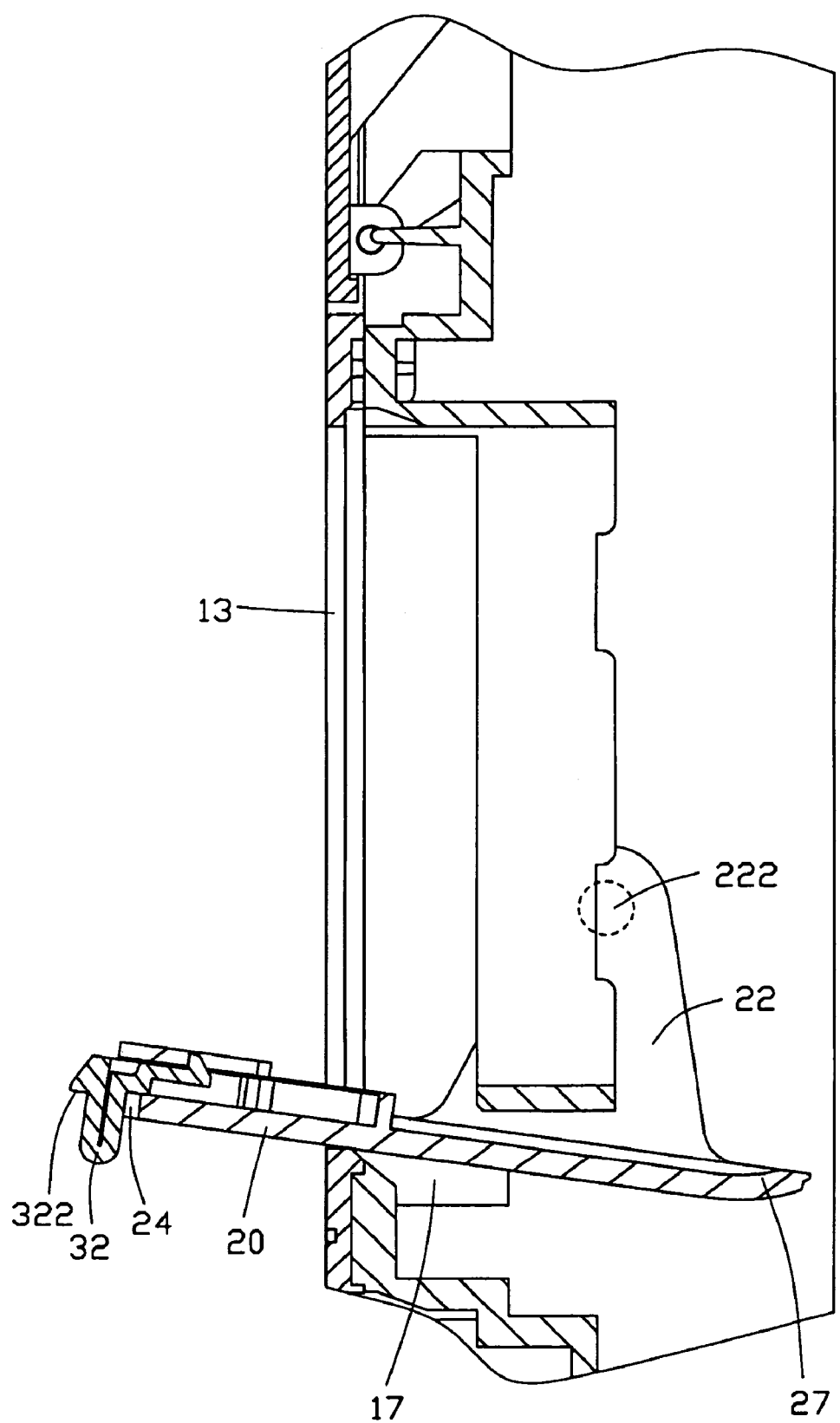

The cover 20 includes a pair of second tabs 22 extending perpendicularly from two longwise ends thereof. A shaft 222 extends outwardly from an outer side of each of the second tabs 22. A cutout 24 is defined in a top portion of the cover 20. A bracket 26 forms on the inner surface of the cover 20, according to the cutout 24. The bracket 26 includes a bottom panel 264, and a back panel 262. A notch 266 is defined in the back panel 262. Referring also to FIGS. 6 and 7, an arced portion 27 is formed in a bottom portion of the cover 20.

The latch member 30 is movably received in the bracket 26 of the cover 20. The latch member 30 includes a main plate 31, a pair of resilient legs 36 extending downwardly from two ends of the main plate 31, and an operating plate 32 extending perpendicular from a top edge of the main plate 31. A latch bar 322 extends upwardly from the operating plate 31. Referring also to FIG. 5, the latch bar 322 includes an engaging wall 324 formed in a front portion thereof. An edge 326 is formed at the top end of the engaging wall 324. A hook 34 extends from the main plate 31, can slidably engaging in the notch 266 of the cover 20.

Referring to FIGS. 3 to 6, in assembly, the latch member 30 is fixed in the bracket 26 of the cover 20, with the resilient legs 36 contacting with the bottom panel 264 thereof and the hook 34 slidably engaging in the notch 266. The second tabs 22 of the cover 20 are extended through the channels 15 of the bezel 10, with the pivoting shafts 222 engaging in the pivoting holes 144 of the bezel 10. The latch bar 322 is received in the latch slot 162 of the bezel 10. The engaging wall 324 of the latch bar 322 of the latch member 30 abuts the vertical wall 164 of the engaging portion 16 of the bezel 10, for preventing a forward movement of the cover 20 rotating about the shafts 222. The edge 326 of the latch bar 322 of the latch member 30 engagingly abuts the horizontal wall 166 of the engaging portion 16 of the bezel 10, for preventing a backward movement of the cover 20 rotating about the shafts 222. A gap 19 is defined between the arced portion 27 of the cover 20 and the bezel 10, for providing a space for the cover 20 at a beginning rotating around the shaft 222 thereof.

Referring also to FIG. 7, to open the cover 20, the operating plate 31 of the latch member 30 is depressed. The resilient legs 36 are deformed and the latch bar 322 of the latch member 30 disengages from the latch slot 162 of the bezel 10. The operating plate 32 is drawn to rotate the cover 20 about the pivoting shafts 222 thereof. The opening 13 is exposed. To close the cover 20, the operating plate 31 of the latch member 30 is pushed to rotate the cover 20 move back to the bezel 10. Then the latch bar 322 of the latch member 30 engages with the engaging portion 16 of the bezel and the legs 36 of the latch member 30 are depressed until the latch bar 322 is locked in the latch slot 162.

It is believed that the present embodiment and its advantages will be understood from the foregoing description, and it will be apparent that various changes may be made thereto without departing from the spirit and scope of the invention or sacrificing all of its material advantages, the examples hereinbefore described merely being preferred or exemplary embodiment of the invention.

We claim:

1. A cover mechanism comprising:
   a bezel defining an opening therein, a latch slot defined in a side portion of the opening, the bezel comprising a first wall and a second wall formed around the latch slot, the first wall perpendicularly connected to the second wall;
   a cover pivotally attached to the bezel to cover the opening; and
   a latch member slidably attached to the cover and comprising a latch bar engagingly located in the latch slot; wherein
   the bezel defines a recess therein, the opening is defined in the recess;
   a pair of channels is defined in the recess beside the opening, a pair of first tabs extends beside the channels, each of the first tabs defines a pivoting hole therein, the cover extends a pair second tabs therefrom, each of the second tabs extends through the channels and comprises a pivoting shaft corresponding to the pivoting hole of the bezel, the latch bar comprising an engaging wall abutting against the first wall to prevent unwanted forward rotation of the cover about the shafts, and an edge engagably abutting against the second wall to prevent unwanted backward rotation of the cover about the shafts.

2. The cover mechanism as claimed in claim 1, wherein the cover defines a cutout in a top portion thereof a bracket extends from an inner side of the cover aligning with the cutout, for receiving the latch member therein.

3. The cover mechanism as claimed in claim 2, wherein the bracket comprises a back panel parallel to the cover, and a bottom panel perpendicular to the cover.

4. The cover mechanism as claimed in claim 3, wherein the latch member comprises a main plate, an operating plate extending through the cutout of the cover, and a pair of resilient legs extends from the main plate engaging with the bottom panel of the bracket.

5. The cover mechanism as claimed in claim 4, wherein the latch bar extends from the operating plate.

6. The cover mechanism as claimed in claim 5, wherein the back panel of the bracket defines a notch therein, the main plate of the latch member extends a hook engaging in the notch.

7. The cover mechanism as claimed in claim 1, wherein the latch slot is defined in an engaging portion formed at a top portion of the opening.

8. The cover mechanism as claimed in claim 1, wherein the cover comprises an arced portion formed in a bottom portion thereof, a gap is defined between the arced portion and the bezel to provide a clearance space for rotation of the cover at beginning.

9. A cover mechanism comprising:
   a bezel defining an opening therein, an engaging portion formed beside the opening, the engaging portion defining a latch slot therein, the engaging portion comprising a first wall and a second wall formed around the latch slot, the first wall perpendicularly connected to the second wall;
   a cover pivoting about an axis spaced from a plane defined by the cover to cover the opening; and
   a discrete latch member movably attached to the cover and comprising a latch bar extending therefrom to engage in the latch slot, the latch bar comprising an engaging wall abutting against the first wall to prevent unwanted forward rotation of the cover about the axis, and an edge engagably abutting against the second wall to prevent unwanted backward rotation of the cover about the axis; wherein
   the bezel defines a recess therein, the opening is defined in the recess, a pair of channels is defined in the recess beside the opening, a pair of first tabs extends beside the channels.

10. The cover mechanism as claimed in claim 9, wherein the cover extends a pair of second tabs extending through the channel.

11. The cover mechanism as claimed in claim 10, wherein the second tabs of the cover each comprises a pivoting shaft extending therefrom, the first tabs of the cover each defines a pivoting hole therein to engage with the corresponding shaft of the cover.

12. The cover mechanism as claimed in claim 9, wherein the cover defines a cutout in a top portion thereof a bracket extends from an inner side of the cover aligning with the cutout, for receiving the latch member therein.

13. The cover mechanism as claimed in claim 12, wherein the bracket comprises a back panel parallel to the cover, and a bottom panel perpendicular to the cover, the latch member comprises a main plate, an operating plate extending through the cutout of the cover, and a pair of resilient legs extends from the main plate engaging with the bottom panel of the bracket.

14. The cover mechanism as claimed in claim 9, wherein the cover comprises an arced portion formed in a bottom portion thereof, a gap is defined between the arced portion and the bezel to provide a clearance space for rotation of the cover at beginning.

15. An electronic device comprising:
   a bezel installable to said electronic device along a side thereof, said bezel defining a recess therein, an opening defined inside said recess to provide an access into said electronic device, a pair of channels defined in said recess beside said opening, a pair of first tabs extending beside said channels, and a latch slot defined therein, a first wall and a second wall disposed around the latch slot, the first wall perpendicularly connected to the second wall;
   a cover pivotably attachable to said bezel beside said opening, said cover movable relative to said bezel between a first position thereof where said cover shields said opening to block said access, and a second position thereof where said cover moves out of said first position thereof to reveal said opening and allow said access, said cover crossing said side of said electronic device and partially located inside said electronic device when said cover moves to said second position thereof from said first position thereof and;

a latch member movably attached to the cover and comprising a latch bar engaging in the latch slot, the latch bar comprising an engaging wall abutting against the first wall to prevent unwanted rotation of the cover in a first direction, and an edge engagably abutting against the second wall to prevent unwanted rotation of the cover in a second direction opposite to the first direction.

16. The electronic device as claimed in claim 15, wherein said cover is pivoted to said pair of first tabs by extending a pair of second tabs through said channel toward said pair of first tabs correspondingly.

17. The electronic device as claimed in claim 15, wherein the latch member is movably attachable to said cover so as to be capable of retaining said cover in said first position thereof when said cover moves to said first position thereof from said second position thereof.

18. The electronic device as claimed in claim 15, wherein the cover comprises an arced portion formed in a bottom portion thereof, a gap is defined between the bezel and the arced portion to provide a clearance space for rotation of the cover at beginning.

* * * * *